United States Patent
Ukil et al.

(10) Patent No.: US 10,733,264 B2
(45) Date of Patent: Aug. 4, 2020

(54) SYSTEM AND METHOD FOR DETECTING OUTLIERS IN REAL-TIME FOR A UNIVARIATE TIME-SERIES SIGNAL

(71) Applicant: Tata Consultany Services Limited, Mumbai (IN)

(72) Inventors: Arijit Ukil, Kolkata (IN); Soma Bandyopadhyay, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 167 days.

(21) Appl. No.: 15/184,494

(22) Filed: Jun. 16, 2016

(65) Prior Publication Data
US 2016/0371228 A1    Dec. 22, 2016

(30) Foreign Application Priority Data
Jun. 17, 2015   (IN) .......................... 2324/MUM/2015

(51) Int. Cl.
*G06F 17/18*   (2006.01)
*G06F 19/00*   (2018.01)
*H04W 4/00*    (2018.01)

(52) U.S. Cl.
CPC .............. *G06F 17/18* (2013.01); *H04W 4/00* (2013.01)

(58) Field of Classification Search
CPC ................................ G06F 17/18; H04W 4/00
USPC .................................................. 702/179, 189
See application file for complete search history.

(56) References Cited

U.S. PATENT DOCUMENTS

| | | | |
|---|---|---|---|
| 7,277,843 B1 | 10/2007 | Wen et al. | |
| 7,395,250 B1 * | 7/2008 | Aggarwal | G06K 9/6284 706/20 |
| 7,904,279 B2 | 3/2011 | Miguelanez et al. | |
| 7,917,338 B2 | 3/2011 | Basak et al. | |
| 8,041,597 B2 | 10/2011 | Li et al. | |
| 8,140,301 B2 | 3/2012 | Abe et al. | |

(Continued)

FOREIGN PATENT DOCUMENTS

EP        3136297        *   3/2017

OTHER PUBLICATIONS

Charu Aggarwal, "Outlier Analysis", 2013.*

(Continued)

*Primary Examiner* — Michael P Nghiem
(74) *Attorney, Agent, or Firm* — Finnegan, Henderson, Farabow, Garrett & Dunner LLP

(57) ABSTRACT

Disclosed is a method and system for detecting outliers in real-time for a univariate time-series signal. The system may receive the univariate time-series signal, comprising a plurality of datasets, from a data source. The system may compute a standard deviation of a dataset of the plurality of datasets. Subsequently, the system may compute the optimal sample block size and the critical sample size of the dataset. Further, the system may determine the optimal operational block size of the dataset. The system may segment the plurality of datasets into blocks based upon the optimal operational block size. The system may detect the outliers by performing an outlier detection technique on the blocks, thereby ensuring improved execution time while minimally affecting precision and accuracy of the outcome of the outlier detection method.

7 Claims, 4 Drawing Sheets

(56) References Cited

U.S. PATENT DOCUMENTS

| | | | |
|---|---|---|---|
| 2008/0167837 A1* | 7/2008 | Basak | G06K 9/00503 |
| | | | 702/179 |
| 2014/0249776 A1* | 9/2014 | King | G06F 17/18 |
| | | | 702/179 |
| 2015/0261963 A1* | 9/2015 | Ukil | H04L 63/04 |
| | | | 726/26 |
| 2016/0364745 A1* | 12/2016 | He | G06Q 30/0243 |
| 2017/0055913 A1* | 3/2017 | Bandyopadhyay | A61B 5/0402 |
| 2018/0046599 A1* | 2/2018 | Nagarajan | G06F 17/18 |

OTHER PUBLICATIONS

Singh et al., "Outlier Detection: Applications and Techniques", Jan. 2012.*

Jung-Tsung Chiang, "The Masking and Swamping Effects Using the Planted Mean-Shift Outliers Models", 2007, Int. J. Contemp. Math. Sciences, vol. 2. (Year: 2007).*

* cited by examiner

SYSTEM AND METHOD FOR DETECTING OUTLIERS IN REAL-TIME FOR A UNIVARIATE TIME-SERIES SIGNAL

PRIORITY CLAIM

This U.S. patent application claims priority under 35 U.S.C. § 119 to: India Application No. 2324/MUM/2015, filed on Jun. 17, 2015. The entire contents of the aforementioned application are incorporated herein by reference.

TECHNICAL FIELD

A large amount of data gets generated by sensors used to monitor physical parameters. The data may then be used to identify significant events related to an area of deployment of the sensors. For an example, the sensors may be deployed in fields to monitor irrigation parameters and may thus form a Wireless Sensor Network (WSN) or generic sensor networks. The sensors may be identified as nodes in the WSN. The nodes of the WSN may continuously transmit the data i.e. Irrigation parameters to a central node or a server. Thus, amount of data received by the server is enormous and may require a lot of processing for determination of the significant events. In another example, the sensors may be used to monitor cardiac activities of a person. Data corresponding to the cardiac activity may then be used to identify a cardiac anomaly and further medical diagnosis. Thus, a large amount of data needs to be processed for deriving a result.

The large amount of data to be used for processing may be reduced upon identification of outliers. The outliers help in identifying significant events present in the large amount of data. Accurate outlier detection techniques require a large number of samples of the data for processing. Thus, processing the large number of samples may require a lot of computations to be performed and thus uses a high execution time. In order to reduce the number of computations, a lesser number of samples may be used for the processing. But, reducing the number of samples while detecting the outliers may lead to false alarms i.e. false identification of the outliers indicating the significant events. An increase in number of false alarms refers to decrease in accuracy.

Referring to FIG. 1, a graphical representation of relationship between accuracy and execution time is explained. Sample size i.e. number of samples to be used in a method for detecting outliers impacts accuracy and execution time related to the method. The execution time i.e. amount of time required to analyze the number of samples rises with an increase in the sample size. At the same time, the accuracy i.e. rate of generation of false alarms reduces while the sample size increases. The FIG. 1 also shows an optimal operating point where the sample size is such that the false alarm rate is least along with an optimum value of the execution time.

SUMMARY

Embodiments of the present disclosure present technological improvements as solutions to one or more of the above-mentioned technical problems recognized by the Inventors in conventional systems.

In one implementation, a method for detecting outliers in real-time for a univariate time-series signal is disclosed. The method may comprise receiving a univariate time-series signal from a data source. The univariate time-series signal may comprise a plurality of datasets. Each dataset of the plurality of datasets may comprise $\mathbb{N}$ number of univariate time-series data elements. The method may further comprise computing a standard deviation ($\sigma$) of a dataset of the plurality of datasets. The method may further comprise computing an optimal sample block size ($\mathbb{m}$) of the dataset by using the standard deviation ($\alpha$). The method may further comprise computing a critical sample size ($\mathbb{m}_{critical}$) of the dataset based on the standard deviation ($\sigma$), the $\mathbb{N}$ number of univariate time-series data elements, a predefined accuracy ($\delta$), and a precision (1–∈) of outcome. The method may also comprise determining an optimal operational block size ($\mathbb{m}_{operational}$) of the dataset. The method may also comprise segmenting the plurality of datasets into blocks based upon the optimal operational block size ($\mathbb{m}_{operational}$). Each block may comprise $\mathbb{N}/\mathbb{m}_{operational}$ data elements of the $\mathbb{N}$ number of univariate time-series data elements. The method may further comprise detecting outliers in real-time by performing an outlier detection technique on the blocks.

In one implementation, a system for detecting outliers in real-time for a univariate time-series signal is disclosed. The system comprises a processor and a memory coupled to the processor for executing programmed instructions stored in the memory. The processor may receive a univariate time-series signal from a data source. The univariate time-series signal may comprise a plurality of datasets. Each dataset of the plurality of datasets may comprise $\mathbb{N}$ number of univariate time-series data elements. The processor may further compute a standard deviation ($\sigma$) of a dataset of the plurality of datasets. The processor may further compute an optimal sample block size ($\mathbb{m}$) of the dataset by using the standard deviation ($\sigma$). The processor may further compute a critical sample size ($\mathbb{m}_{critical}$) of the dataset based on the standard deviation ($\alpha$), the $\mathbb{N}$ number of univariate time-series data elements, a predefined accuracy ($\delta$), and a precision (1–∈) of outcome. The processor may further determine an optimal operational block size ($\mathbb{m}_{operational}$) of the dataset. The processor may further segment the plurality of datasets into blocks based upon the optimal operational block size $\mathbb{m}_{operational}$). Each block may comprise $\mathbb{N}/\mathbb{m}_{operational}$ data elements of the $\mathbb{N}$ number of univariate time-series data elements. The processor may detect outliers in real-time by performing an outlier detection technique on the blocks.

In one implementation, a non-transitory computer readable medium embodying a program executable in a computing device for detecting outliers in real-time for a univariate time-series signal is disclosed. The program may comprise a program code for receiving a univariate time-series signal from a data source. The univariate time-series signal may comprise a plurality of datasets. Each dataset of the plurality of datasets may comprise $\mathbb{N}$ number of univariate time-series data elements. The program may further comprise a program code for computing a standard deviation ($\sigma$) of a dataset of the plurality of datasets. The program may further comprise a program code for computing an optimal sample block size ($\mathbb{m}$) of the dataset by using the standard deviation ($\sigma$). The program may further comprise a program code for computing a critical sample size ($\mathbb{m}_{critical}$) of the dataset based on the standard deviation ($\sigma$), the $\mathbb{N}$ number of univariate time-series data elements, a predefined accuracy ($\delta$), and a precision (1–∈) of outcome. The program may further comprise a program code for determining an optimal operational block size ($\mathbb{m}_{operational}$) of the dataset. The program may further comprise a program code for segmenting the plurality of datasets into blocks based upon the optimal operational block size ($\mathbb{m}_{operational}$). Each block may comprise $\mathbb{N}/\mathbb{m}_{operational}$ data elements of the $\mathbb{N}$ number of univariate time-series data elements. The program may further comprise a program code for detecting outliers in real-time by performing an outlier detection technique on the blocks.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

System and method for detecting outliers in real-time for a univariate time-series signal are described in the present subject matter. The system may receive a univariate time-series signal from a data source. The univariate time-series signal may comprise a plurality of datasets. Each dataset of the plurality of datasets may comprise $\mathbb{N}$ number of univariate time-series data elements. The system may compute a standard deviation ($\sigma$) of a dataset of the plurality of datasets. By using the standard deviation ($\sigma$), the system may further compute an optimal sample block size ($\mathbb{m}$) and a critical sample size ($\mathbb{m}_{critical}$) of the dataset. Further, the system may determine an optimal operational block size ($\mathbb{m}_{operational}$) of the dataset. Further, the system may segment the plurality of datasets into blocks based upon the optimal operational block size. Each block may comprise $\mathbb{N}/\mathbb{m}_{operational}$ data element of the $\mathbb{N}$ number of univariate time-series data elements. Subsequently, the system may detect outliers by performing an outlier detection technique on each of the blocks. Thus, the system may detect the outliers in real-time for the univariate time-series signal using an above described method.

While aspects of described system and method for detecting outliers in real-time for a univariate time-series signal may be implemented in any number of different computing systems, environments, and/or configurations, the embodiments are described in the context of the following exemplary system.

Figure 2:
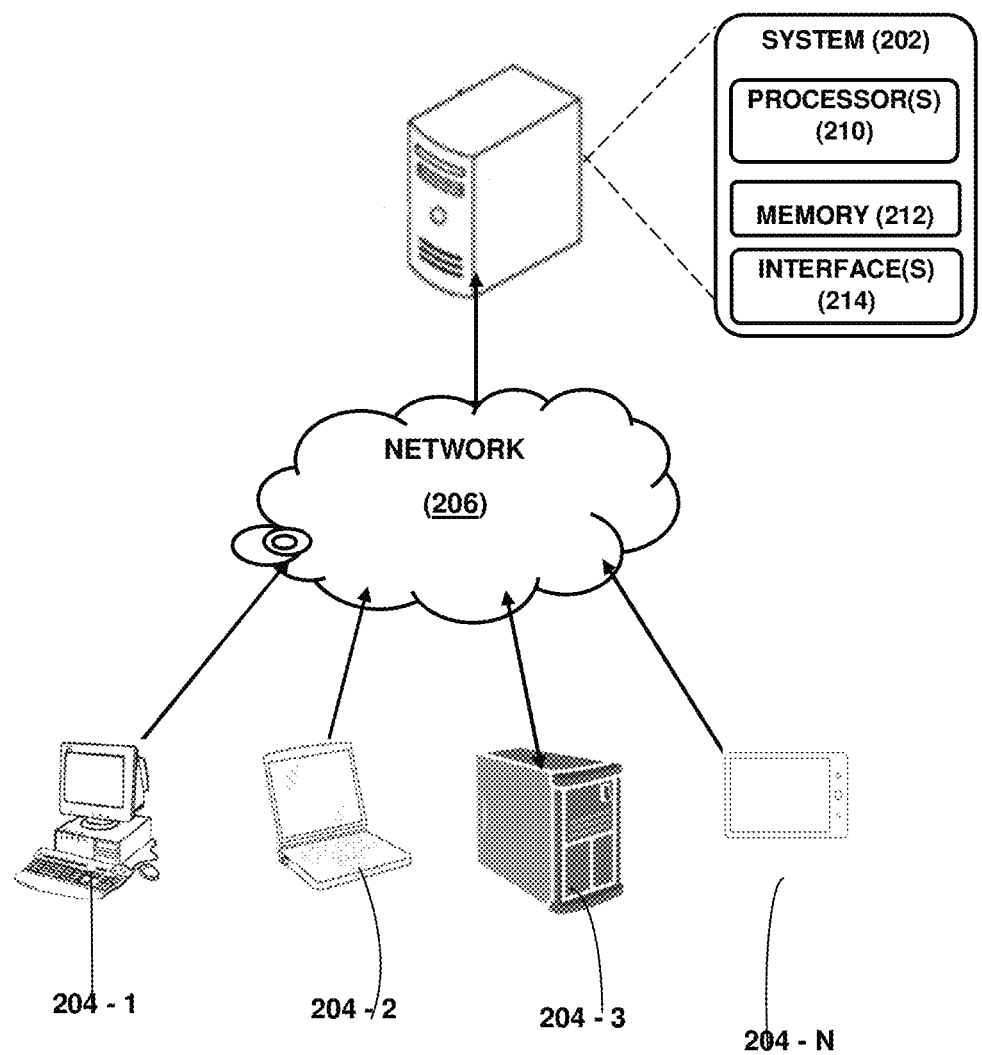
FIG. 2 illustrates a network implementation of a system for detecting outliers in a univariate time-series signal, in accordance with an embodiment of the present subject matter.

Referring now to FIG. 2, the system 202 for detecting outliers in real-time for a univariate time-series signal is shown, in accordance with an embodiment of the present subject matter. Although the present subject matter is explained considering that the system 202 is implemented on a computer, it may be understood that the system 202 may also be implemented in a variety of computing systems including but not limited to, a smart phone, a tablet, a notepad, a personal digital assistant, a handheld device, a laptop computer, a notebook, a workstation, a mainframe computer, a server, and a network server. In one embodiment, the system 202 may be implemented in a cloud-based environment. It will be understood that the system 202 may be accessed by multiple users through one or more user devices 204-1, 204-2 . . . 204-N, collectively referred to as user device 204 hereinafter, or applications residing on the user device 204. Examples of the user device 204 may include, but are not limited to, a portable computer with a webcam, a personal digital assistant with a camera, a handheld device with a camera, and a digital camera. The user device 204 is communicatively coupled to the system 202 through a network 206.

In one implementation, the network 206 may be a wireless network, a wired network or a combination thereof. The network 206 can be implemented as one of the different types of networks, such as intranet, local area network (LAN), wide area network (WAN), the internet, and the like. The network 206 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 1:
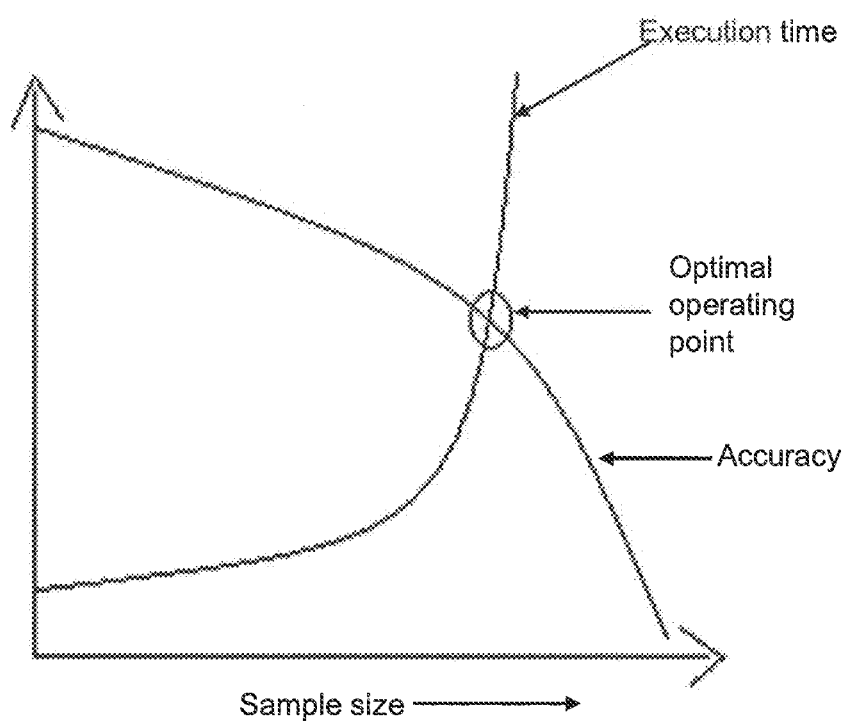
FIG. 1 illustrates a graphical representation of relationship between accuracy and execution time, with respect to sample size, as known in prior art.

In one embodiment, as illustrated using the FIG. 1, the system 202 may include at least one processor 210, a memory 212, and input/output (I/O) interfaces 214. Further, the at least one processor 210 may be implemented as one or more microprocessors, microcomputers, microcontrollers, digital signal processors, central processing units, state machines, logic circuitries, and/or any devices that manipulate signals based on operational instructions. Among other capabilities, the at least one processor 210 is configured to fetch and execute computer-readable instructions stored in the memory 212.

The I/O interfaces 214 may include a variety of software and hardware interfaces, for example, a web interface, a graphical user interface, and the like. The I/O interfaces 214 may allow the system 202 to interact with a user directly. Further, the I/O interfaces 214 may enable the system 202 to communicate with other computing devices, such as web servers and external data servers (not shown). The I/O interfaces 214 can facilitate multiple communications within a wide variety of networks and protocol types, including wired networks, for example, LAN, cable, etc., and wireless networks, such as WLAN, cellular, or satellite.

The memory 212 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one embodiment, the system 202 may require a large sample size for removing a bias present in a distribution of the samples to be analyzed. Using the large sample size may lead to a rise in the execution time and thus resulting to a reduction in the efficiency. In one case, the system 202 may determine kurtosis of data blocks in order to prepare a kurtosis pattern. In case of a leptokurtic pattern, the system 202 may use a Rosner filtering technique else the system may use a Hampel filtering technique. Further, in order to improve the accuracy, the system 202 may need to minimize the false alarms. The false alarms may comprise masking effects and swamping effects. In one case, the system 202 may use the Hampel filtering technique to minimize the masking effects, and the Rosner filtering technique to minimize the swamping effects.

In one case, $\mathbb{N}$ may indicate a number of univariate time-series data elements present in each dataset of a univariate time-series signal, and $\mathbb{m}$ may indicate the optimal sample block size. An execution time for masking effect attenuators may be assumed as $\tau_{ma}$ and the execution time for swamping effect attenuators may be assumed a $\tau_{sa}$. Generally the Hampel filtering technique performs less computations than Rosner filtering technique, and thus $\tau_{ma} \ll \tau_{sa}$. Computational complexity of the Hampel filtering technique may be $O(N)$ and computational complexity of the Rosner filtering technique may be $O(N^2)$.

In one implementation, the system 202 may receive a univariate time-series signal from a data source. The term univariate may refer to expressions, equations, and functions having a single variable. The data source may be the memory 212, having stored data captured by sensors or devices. The sensors or the devices may comprise a smart meter, an accelerometer, an Electro Encephalogram (EEG), an Electro Cardiograph (ECG) or other devices. In a case, the univariate time-series signal may comprise a plurality of datasets. Further, each dataset of the plurality of datasets may comprise $\mathbb{N}$ number of univariate time-series data elements.

In one embodiment, the system 202 may determine time criticality of an application associated with the univariate time-series signal. In one case, the time criticality maybe real-time or pseudo real-time. During such a case, the system 202 may compute a standard deviation (σ) of a dataset of the plurality of datasets. The system may compute the standard deviation (σ) by using known statistical techniques.

Upon computing the standard deviation (σ), the system 202 may compute an optimal sample block size ($\mathbb{m}$) of the dataset. In a case, the system 202 may compute the optimal sample block size ($\mathbb{m}$) using an Equation 1, as mentioned below.

$$\mathbb{m} = \frac{\sigma}{(1-\delta)\epsilon^2} \quad \text{Equation 1}$$

In the above mentioned equation 1, $\epsilon$ indicates precision loss and δ indicates accuracy. Further, $\epsilon$ and δ may be application dependent.

Subsequent to computation of the sample block size ($\mathbb{m}$), the system 202 may compute a critical sample size ($\mathbb{m}_{critical}$) of the dataset based on the standard deviation (σ), the $\mathbb{N}$ number of univariate time-series data elements, a predefined accuracy (δ), and a precision ($(1-\epsilon)$) of outcome. In one case, the system 202 may compute the critical sample size ($\mathbb{m}_{critical}$) using an equation 2 as mentioned below.

$$\mathbb{m}_{critical} = \min\left\{\frac{\sigma}{(1-\delta)\epsilon^2}, |\mathbb{N}|/2\right\} \quad \text{Equation 2}$$

Post computing the critical sample size ($\mathbb{m}_{critical}$), the system 202 may determine an optimal operational block size ($\mathbb{m}_{operational}$) of the dataset. In one case, the system 202 may determine the optimal operational block size ($\mathbb{m}_{operational}$) using an equation 3, as mentioned below.

$$\mathbb{m}_{operational} = \{(|\mathbb{N}| \bmod \mathbb{m}_{critical} = 0\} \quad \text{Equation 3}$$

Post determining the optimum block size ($\mathbb{m}_{operational}$), the system 202 may segment the plurality of datasets into blocks, based upon the optimal operational block size ($\mathbb{m}_{operational}$). Each block may comprise $\mathbb{N}/\mathbb{m}_{operational}$ data element of the $\mathbb{N}$ number of univariate time-series data elements. Subsequently, the system 202 may detect outliers by performing an outlier detection technique on each of the block comprising $\mathbb{N}/\mathbb{m}_{operational}$ data elements. In one case, the system 202 may use unsupervised techniques like Rosner filtering technique and Hampel filtering technique for outlier detection.

In order to further explain the description provided above, an example is provided. In one case, the data of a smart meter may be analyzed for outlier detection. A value of precision $(1-\epsilon)$ may be assumed as 0.8. A value of the accuracy (δ) may be assumed as 0.2. In one case, $12*10^3$ samples i.e. number of univariate time-series data elements ($\mathbb{N}$). The standard deviation (σ), computed by the system 202, may be 300. The system 202 may determine the critical sample size ($\mathbb{m}_{critical}$) using the above mentioned equation 2 based on the precision $(1-\epsilon)$, accuracy (δ), the $\mathbb{N}$ number of univariate time-series data elements, and the standard deviation (σ). During the present case, the critical sample size ($\mathbb{m}_{critical}$) determined by the system 202 may be 100. Thus, the system 202 may need to perform analysis of 120 number of 100 univariate time-series data blocks for detecting the outliers. In a case the outlier detection technique may use Rosner filtering, and total time required may be calculated as $120*O(10^4)$. In another case, while Rosner filtering is used on entire sample, computation time is $O(144*10^6)$. Thus, the system 202 provides better execution time performance ($120*O(10^4)$) as compared to conventional time performance ($O(144*10^6)$).

Figure 3A:
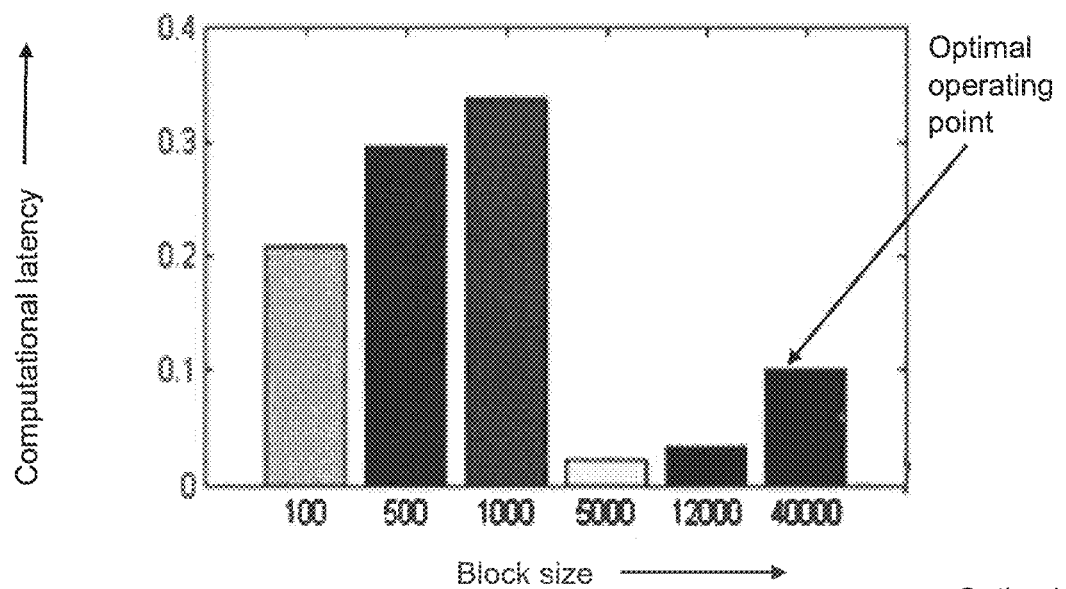
FIG. 3a illustrates an exemplary graphical representation of relationship between computational latency and block size, in accordance with an embodiment of the present subject matter.
Figure 3B:
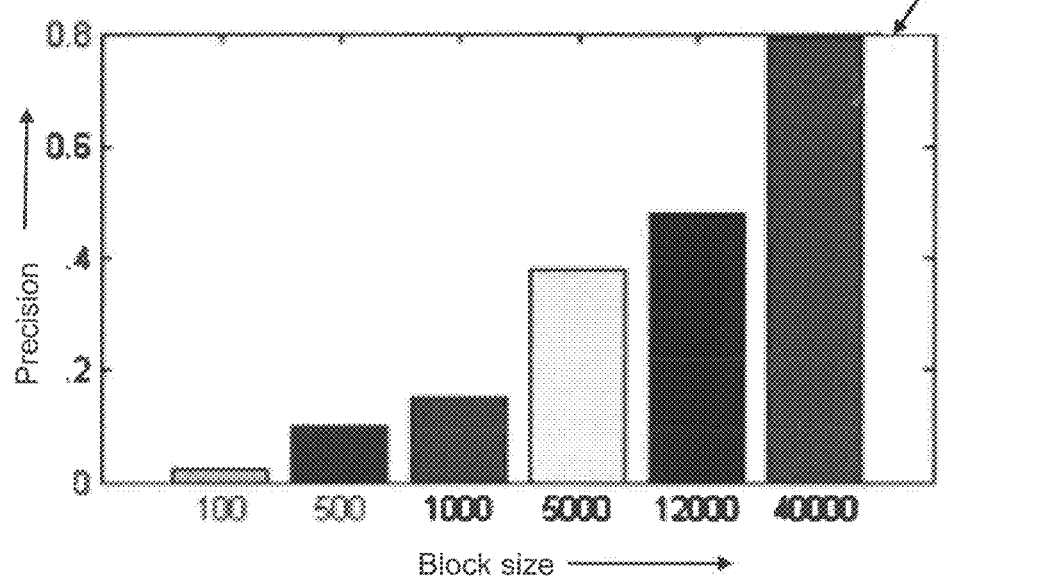
FIG. 3b illustrates an exemplary graphical representation of relationship between precision and block size, in accordance with an embodiment of the present subject matter.

Referring to FIG. 3a, an exemplary graphical representation of relationship between computational latency and block size is explained. The FIG. 3a illustrates experimental data showing an optimum value of computational latency while the sample size is 40000. The sample size of 40000 in present case is identified as the optimal operating point. Referring to FIG. 3b, an exemplary graphical representation of relationship between precision and block size is explained. The FIG. 3b Illustrates the experimental data showing a highest value of precision while the sample size is 40000. Thus, the system 202 achieves a maximum value of precision while the sample size is 40000 i.e. at the optimal operating point.

In one embodiment, the system 202 may simultaneously achieve efficiency and effectivity by operating on the optimal operating point. The system 202 may further use the outliers for identifying sensitive content of the univariate time-series signal. The system may further use the sensitive content for measuring privacy, fraud detection, and other applications.

Figure 4:
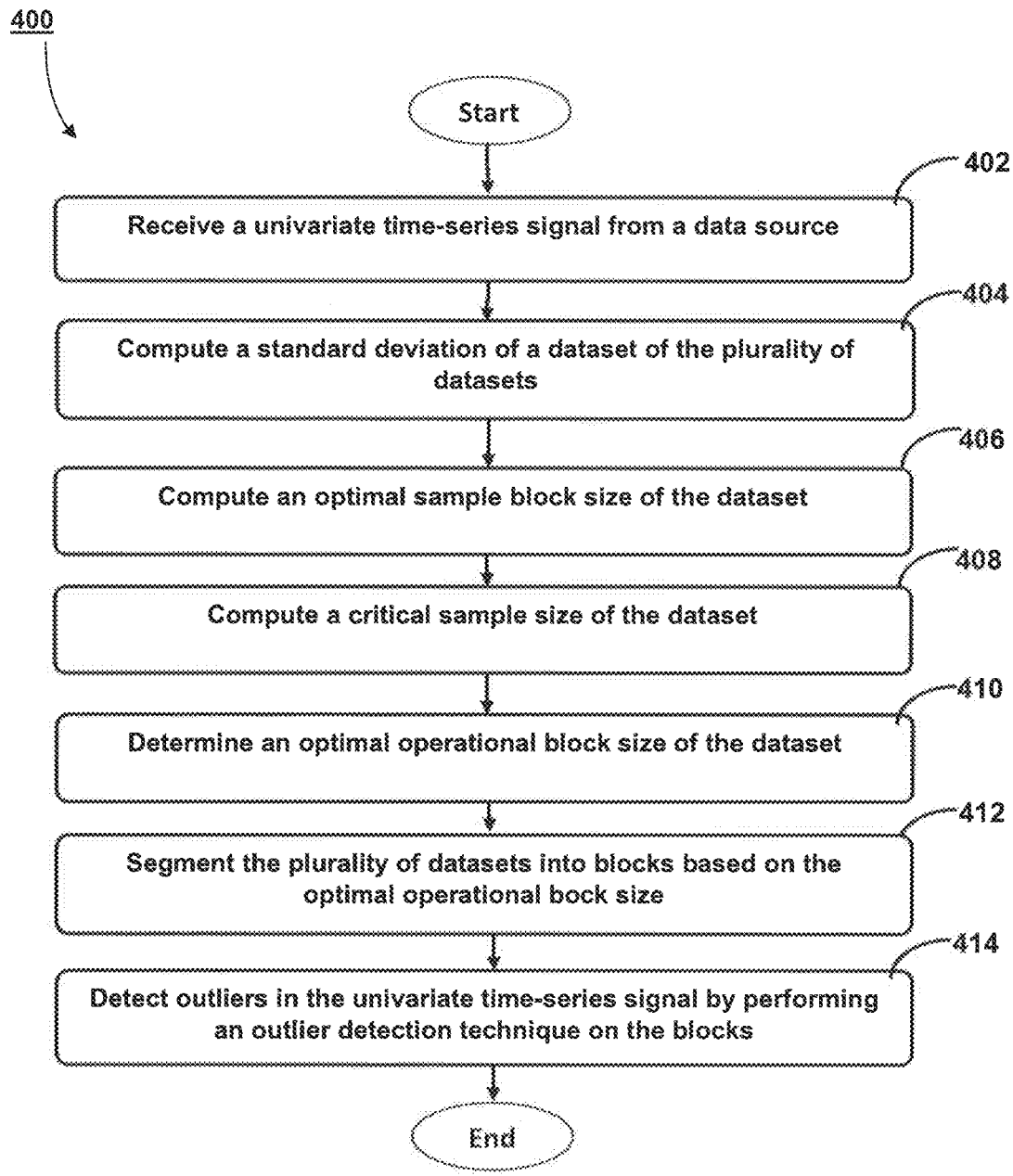
FIG. 4 shows flowchart illustrating a method for detecting outliers in a univariate time-series signal, in accordance with an embodiment of the present subject matter.

Referring now to FIG. 4, a method 400 for detecting outliers in real-time for a univariate time-series signal is described, in accordance with an embodiment of the present subject matter. The method 400 may be described in the general context of computer executable instructions. Generally, computer executable instructions can Include routines, programs, objects, components, data structures, procedures, modules, functions, etc., that perform particular functions or Implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, Individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 202.

At block 402, a univariate time-series signal may be received from a data source. The univariate time-series signal may comprise a plurality of datasets. In one Implementation, the univariate time-series signal may be received by the processor 210.

At block 404, a standard deviation of a dataset of the plurality of datasets may be computed. In one implementation, the standard deviation may be computed by the processor 210.

At block 406, an optimal sample block size of the plurality of dataset may be computed by using the standard deviation. In one implementation, the optimal sample block size may be computed by the processor 210.

At block 408, a critical sample size of the dataset may be computed. The critical sample size may be computed based on the standard deviation, number of univariate time-series data elements, a predefined accuracy, and a precision. In one implementation, the critical sample size may be computed by the processor 210.

At block 410, an optimal operational block size of dataset may be determined. In one implementation, the optimal operational block size of the dataset may be determined by the processor 210.

At block 412, the plurality of datasets may be segmented into blocks, based upon the optimal operational block size. In one implementation, the plurality of datasets may be segmented into the blocks by the processor 210.

At block 414, outliers may be detected by performing an outlier detection technique on the blocks. In one implementation, the outliers may be detected by the processor 210.

Although implementations for methods and systems for detecting outliers in a univariate time-series signal have been described in language specific to structural features and/or methods, it is to be understood that the appended claims are not necessarily limited to the specific features or methods described. Rather, the specific features and methods are disclosed as examples of implementations for detecting outliers in a univariate time-series signal.

Exemplary embodiments discussed above may provide certain advantages. Though not required to practice aspects of the disclosure, these advantages may include those provided by the following features.

Some embodiments may enable a system and a method to detect outliers in a univariate time-series signal for identifying sensitive content of the univariate time-series signal.

Some embodiments may further enable a system and a method to use the sensitive content of the univariate time-series signal for measuring privacy and fraud detection.

Some embodiments may enable a system and a method to derive an optimal operating point for detecting the outliers in the univariate time-series signal.

Some embodiments may enable a system and a method to achieve efficiency and effectivity, at a same time, based on the optimal operating point.

Some embodiments may enable a system and a method to improve computational performance of unsupervised outlier detection method with insignificant detriment to accuracy of results.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting outliers in real-time for a univariate time-series signal, the method comprising:
   receiving, by a processor 210, a univariate time-series signal from a data source having stored data captured by sensors, wherein the univariate time-series signal comprises a plurality of datasets, and wherein each dataset of the plurality of datasets comprises $\mathbb{N}$ number of univariate time-series data elements;
   computing, by the processor 210, a standard deviation ($\sigma$) of a dataset of the plurality of datasets;
   computing, by the processor 210, an optimal sample block size ($\mathbb{m}$) of the dataset by using the standard deviation ($\sigma$);
   computing, by the processor 210, a critical sample size ($\mathbb{m}_{critical}$) of the dataset based on the standard deviation ($\sigma$), the N number of univariate time-series data elements, an accuracy ($\delta$) in minimizing false alarms, and a precision ($1-\in$) of outcome related to the critical sample size $\mathbb{m}_{critical}$;
   determining, by the processor 210, an optimal operational block size ($\mathbb{m}_{operational}$) of the dataset using $\mathbb{m}_{operational} = \{(|\mathbb{N}| \mod \mathbb{m}_{critical} = 0\}$, wherein $\mathbb{N}$ indicates number of univariate time-series data elements and $\mathbb{m}_{critical}$ indicates the critical sample size;
   segmenting, by the processor 210, the plurality of datasets into blocks based upon the optimal operational block size ($\mathbb{m}_{operational}$), wherein each block comprises $\mathbb{N}/\mathbb{m}_{operational}$ data elements of the $\mathbb{N}$ number of univariate time-series data elements; and
   detecting, by the processor 210, outliers in real-time by performing an outlier detection technique on the blocks of the segmented plurality of datasets, wherein the outlier detection technique comprises one or more unsupervised techniques including at least one of a Rosner filtering technique to minimize swamping effects or a Hampel filtering technique to minimize masking effects.

2. The method of claim 1, wherein the optimal sample block size $$\mathbb{m} = \frac{\sigma}{(1-\delta)\epsilon^2}.$$

wherein $\sigma$ indicates the standard deviation, $\in$ indicates precision loss and $\delta$ indicates the accuracy.

3. The method of claim 1, wherein the critical sample size ($\mathbb{m}_{critical}$) is computed using $$\mathbb{m}_{critical} = \min\left\{\frac{\sigma}{(1-\delta)\epsilon^2}, |\mathbb{N}|/2\right\}.$$

wherein $\sigma$ indicates the standard deviation, $\in$ indicates precision loss, $\delta$ indicates the accuracy and $\mathbb{N}$ indicates number of univariate time-series data elements.

4. A system implemented on a cloud-based environment for detecting outliers in real-time for a univariate time-series signal, the system comprises:
   a processor 210;
   a memory 212 coupled to the processor 210, wherein the processor is capable for executing programmed instructions stored in the memory 212 to:
   receive a univariate time-series signal from a data source having stored data captured by sensors, wherein the univariate time-series signal comprises a plurality of datasets, and wherein each dataset of the plurality of datasets comprises $\mathbb{N}$ number of univariate time-series data elements;
   compute a standard deviation ($\sigma$) of a dataset of the plurality of datasets;
   compute an optimal sample block size ($\mathbb{m}$) of the dataset by using the standard deviation ($\sigma$);
   compute a critical sample size ($\mathbb{m}_{critical}$) of the dataset based on the standard deviation ($\sigma$), the $\mathbb{N}$ number of univariate time-series data elements, an accuracy ($\delta$) in minimizing false alarms, and a precision ($1-\in$) of outcome related to the critical sample size $\mathbb{m}_{critical}$;
   determine an optimal operational block size ($\mathbb{m}_{operational}$) of the dataset using $\mathbb{m}_{operational} = \{(|\mathbb{N}| \mod \mathbb{m}_{critical} = 0\}$, wherein $\mathbb{N}$ indicates number of univariate time-series data elements and $\mathbb{m}_{critical}$ indicates the critical sample size;
   segment the plurality of datasets into blocks based upon the optimal operational block size ($\mathbb{m}_{operational}$), wherein each block comprises $\mathbb{N}/\mathbb{m}_{operational}$ data elements of the $\mathbb{N}$ number of univariate time-series data elements; and
   detect outliers in real-time by performing an outlier detection technique on the blocks of the segmented plurality of datasets, wherein the outlier detection technique comprises one or more unsupervised techniques including at least one of a Rosner filtering technique to minimize swamping effects or a Hampel filtering technique to minimize masking effects.

5. The system of claim 4, wherein the sample block size ($\mathbb{m}$) is computed using $$(\mathbb{m}) \text{ is computed using} = \frac{\sigma}{(1-\delta)\epsilon^2}.$$

wherein $\sigma$ indicates the standard deviation, $\in$ indicates precision loss and $\delta$ indicates the accuracy.

6. The system of claim 4, wherein the critical sample size ($\mathbb{m}_{critical}$) is computed using $$\mathbb{m}_{critical} = \min\left\{\frac{\sigma}{(1-\delta)\epsilon^2}, \frac{|\mathbb{N}|}{2}\right\}.$$

wherein $\sigma$ indicates the standard deviation, $\in$ indicates precision loss, $\delta$ indicates the accuracy and $\mathbb{N}$ indicates number of univariate time-series data elements.

7. A non-transitory computer readable medium embodying a program executable in a computing device for detecting outliers in real-time for a univariate time-series signal, the program comprising:

a program code for receiving a univariate time-series signal from a data source having stored data captured by sensors, wherein the univariate time-series signal comprises a plurality of datasets, and wherein each dataset of the plurality of datasets comprises $\mathbb{N}$ number of univariate time-series data elements;

a program code for computing a standard deviation ($\sigma$) of a dataset of the plurality of datasets;

a program code for computing an optimal sample block size ($\mathfrak{m}$) of the dataset by using the standard deviation ($\sigma$);

a program code for computing a critical sample size ($\mathfrak{m}_{critical}$) of the dataset based on the standard deviation ($\sigma$), the $\mathbb{N}$ number of univariate time-series data elements, an accuracy ($\delta$) in minimizing false alarms, and a precision ($1-\in$) of outcome related to the critical sample size $\mathfrak{m}_{critical}$;

a program code for determining an optimal operational block size ($\mathfrak{m}_{operational}$) of the dataset using $\mathfrak{m}_{critical} = \{(|\mathbb{N}| \mod \mathfrak{m}_{critical} = 0\}$, wherein $\mathbb{N}$ indicates number of univariate time-series data elements and $\mathfrak{m}_{critical}$ indicates the critical sample size;

a program code for segmenting the plurality of datasets into blocks based upon the optimal operational block size ($\mathfrak{m}_{operational}$), wherein each block comprises $\mathbb{N}/\mathfrak{m}_{operational}$ data elements of the $\mathbb{N}$ number of univariate time-series data elements; and a program code for detecting outliers in real-time by performing an outlier detection technique on the blocks of the segmented plurality of datasets, wherein the outlier detection technique comprises one or more unsupervised techniques including at least one of a Rosner filtering technique to minimize swamping effects or a Hampel filtering technique to minimize masking effects.

* * * * *